June 21, 1960    H. H. BUSCHERS    2,941,442
IMPROVED HOOK RELEASE MECHANISM FOR A BOMB RACK
Filed May 13, 1957    8 Sheets-Sheet 1

INVENTOR
Herbert H. Buschers
BY
*Julian C. Renfro*
ATTORNEY

June 21, 1960 H. H. BUSCHERS 2,941,442
IMPROVED HOOK RELEASE MECHANISM FOR A BOMB RACK
Filed May 13, 1957 8 Sheets-Sheet 2

INVENTOR
Herbert H. Buschers
BY
ATTORNEY

FIG. 4  FIG. 9  FIG. 10

INVENTOR
Herbert H. Buschers
BY
ATTORNEY

June 21, 1960  H. H. BUSCHERS  2,941,442
IMPROVED HOOK RELEASE MECHANISM FOR A BOMB RACK
Filed May 13, 1957  8 Sheets-Sheet 6

INVENTOR
Herbert H. Buschers
BY
Julian C. Renfro
ATTORNEY

United States Patent Office 2,941,442
Patented June 21, 1960

2,941,442
IMPROVED HOOK RELEASE MECHANISM FOR A BOMB RACK

Herbert H. Buschers, Riderwood, Md., assignor to The Martin Company, a corporation of Maryland Filed May 13, 1957, Ser. No. 658,654

2 Claims. (Cl. 89—1.5)

The present invention relates to improvements in bomb racks and similar devices, the term bomb rack as used herein being intended to include mechanisms for releasably securing objects such as bombs, fuel tanks, stores, etc. in or to aircraft.

More specifically, the invention relates to a bomb rack having a load securing mechanism of novel and improved design, which facilitates the securing and releasing of loads, substantially regardless of the magnitude thereof. In this respect, the new bomb rack incorporates hook means of a self-releasing type, in combination with an improved mechanism for selectively holding the hook means in load-engaging position and effecting the release of the load at a desired time.

In bomb racks of known construction, the use of self-releasing hooks means for engaging the load is more or less conventional. Such hook means generally comprise one or more pivoted hook members adapted to be held in a closed position by a latch or similar device. One of the apparent disadvantages of the known mechanisms has been that the force or power required to disengage the latch means increases substantially in proportion to the weight of the load. Accordingly, in order to provide a rack capable of supporting and releasing loads of various magnitude, the release mechanism is required to be sufficiently heavy and powerful to release the largest contemplated load.

The present invention seeks to provide a bomb rack, including self-releasing hook means, wherein a novel and improved release mechanism is employed to effect the desired operation of the hook means. More specifically, the invention provides a release mechanism for a bomb rack which is adapted to operate substantially independently of the load supported by the rack.

One of the specific advantageous features of the new apparatus resides in the provision, in a bomb rack, of pivoted, self-releasing hook means, in combination with a novel release mechanism including a rotatable sear block adapted to effect release of the load at a desired time. In accordance with the invention, the hook means and sear block are so arranged that operation of the sear block, to effect the release of a load, may be accomplished substantially without regard to the magnitude of the load.

In accordance with one preferred embodiment of the invention, releasable hook means are provided which comprise a pair of tong-like hook members pivoted intermediate their ends and having load engaging portions at their lower extremities. A sear block is rotatably mounted between the upper ends of the hook members and is adapted, in one of its rotary positions, to hold the upper ends of the hook members in separated relation, thereby maintaining the hook members in load-engaging positions. When the sear block is moved to the other of its operative rotary positions, the upper ends of the hook members are free to pivot inwardly, under the influence of the load, thereby effecting the release of the load.

In accordance with the invention, the sear block is so arranged with respect to the hook members that the forces applied to the sear block, in holding the hook members in load-engaging position, are directed along an axis intersecting the rotational axis of the sear block. Also in accordance with the invention, the active surface portions of the sear block are arcuate, being generated about the rotational axis of the block. Accordingly, forces applied to the sear block in maintaining the hook member in load-engaging position do not act upon the sear block in such manner as to prevent or impede rotation thereof in effecting the release of a load.

Another specific feature of the invention resides in the provision, in a mechanism of the type and having the characteristics set forth above, of improved arrangements for eliminating the effects of frictional forces in the release mechanism. In this respect, it will be understood that relatively large forces are applied to the release mechanism when extremely heavy loads are supported by the rack. Accordingly, even though the direction of application of such forces, in relation to the release mechanism, is not such as to prevent or actively impede the operation of the mechanism, the forces may tend to create considerable friction in the mechanism to interfere with the free operation of the release mechanism. In the improved apparatus, force is applied to the release mechanism through antifriction members, which reduce to a practicable minimum the effects of frictional forces and facilitate the actuation of the release mechanism under all conditions.

Other novel and advantageous features of the invention include specific improvements in various components of a bomb rack related to the release mechanism to the end that the complete bomb rack may be of relatively simplified construction, while at the same time being fool-proof in its operation.

For a better understanding of the invention, reference may be made to the following detailed description and accompanying drawings in which.

Figure 1:
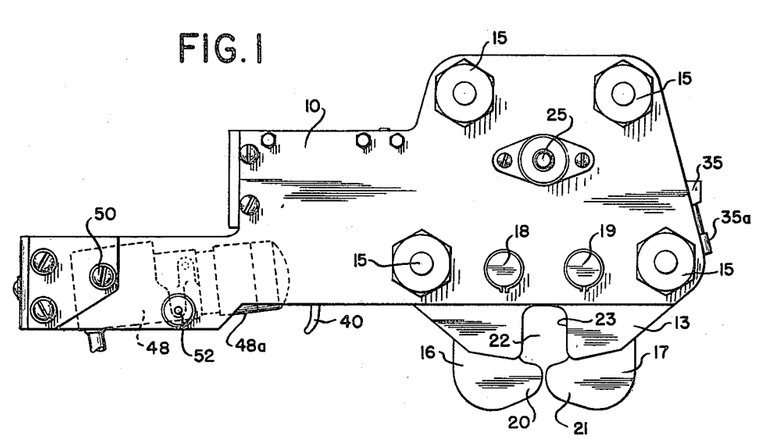
Fig. 1 is a side elevation of a bomb rack incorporating the improved features of the invention.
Figure 2:
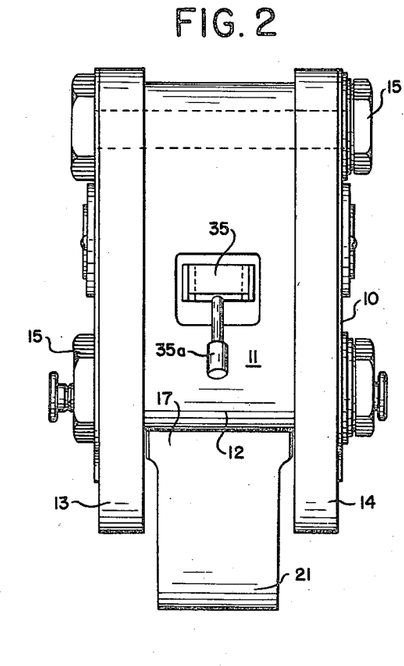
Fig. 2 is an end elevation of the bomb rack of Fig. 1.
Figure 3:
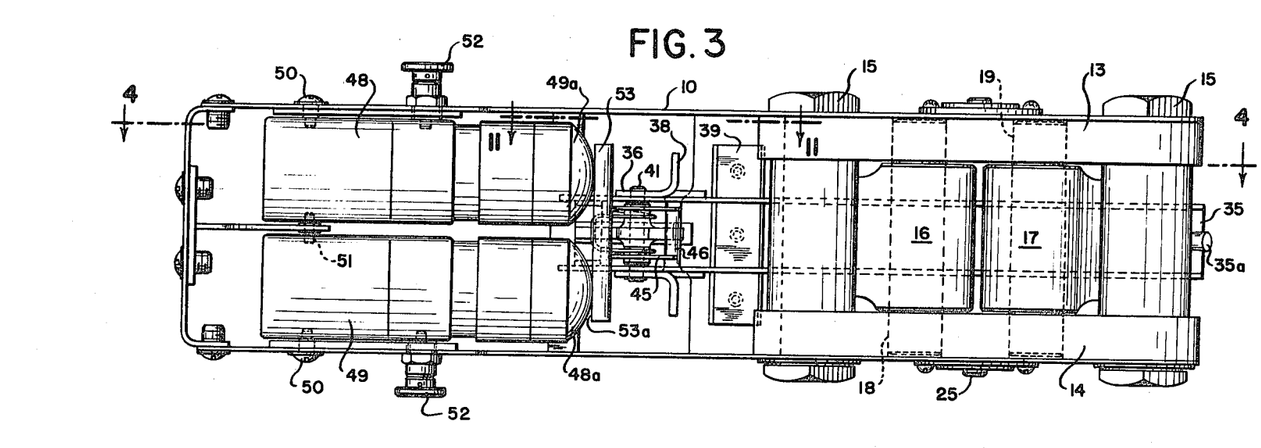
Fig. 3 is a bottom plan view of the bomb rack of Fig. 1.

Referring now to the drawing, and initially Figs. 1-12 thereof, the numeral 10 designates generally the housing of a bomb rack assembly, the illustrated assembly having a single means for engaging a bomb or load, and being adapted for use in conjunction with one or more similar assemblies in actual practice. Adjacent one end of the housing 10 is a heavy frame structure 11, comprising an inverted U-shaped frame member 12 and heavy side plates 13, 14. The parts 12—14 of the frame 11 are secured together and fastened to the housing by means of a plurality of bolts 15 extending through the entire assembly, as shown in Figs. 1-3, for example. The assembly including the frame 11 and housing 10 is adapted to be appropriately mounted upon an aircraft, by suitable means, not specifically shown.

Figures 4, 9, 10:
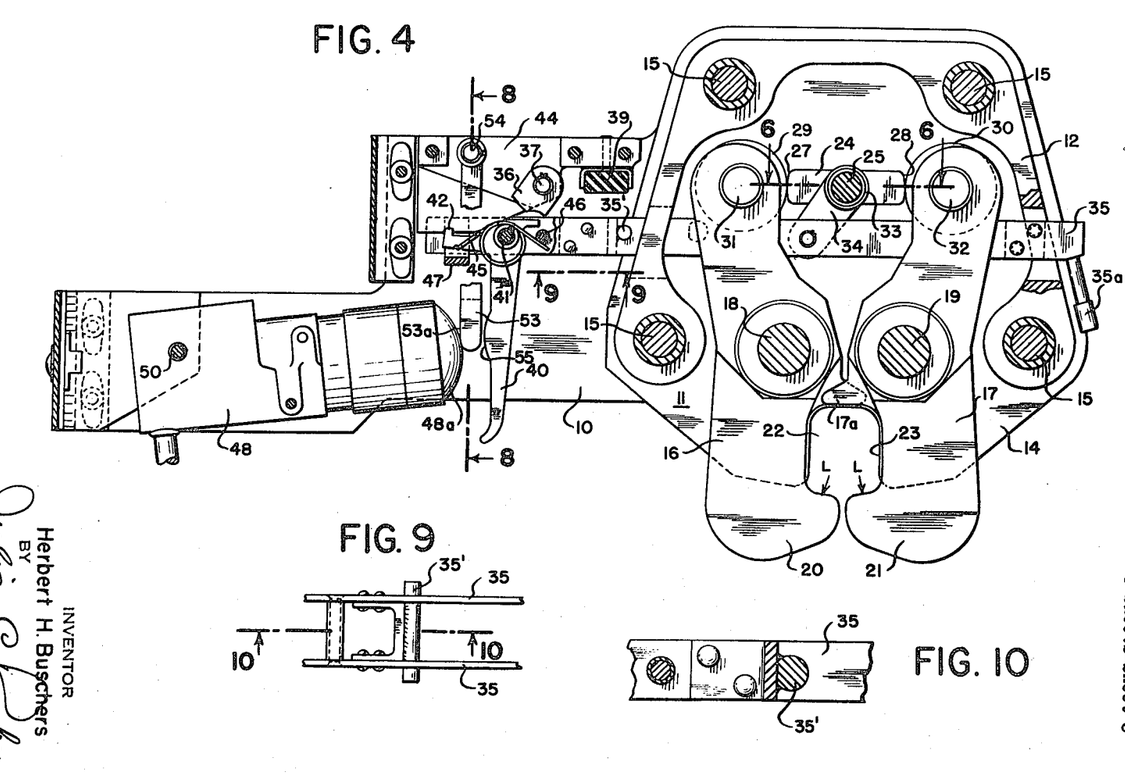
Fig. 4 is a cross-sectional view taken generally along line 4—4 of Fig. 3, illustrating the hook means in load engaging position.
Fig. 9 is a fragmentary cross-sectional view taken generally along line 9—9 of Fig. 4.
Fig. 10 is a fragmentary cross-sectional view taken along line 10—10 of Fig. 9.
Figures 5, 7:
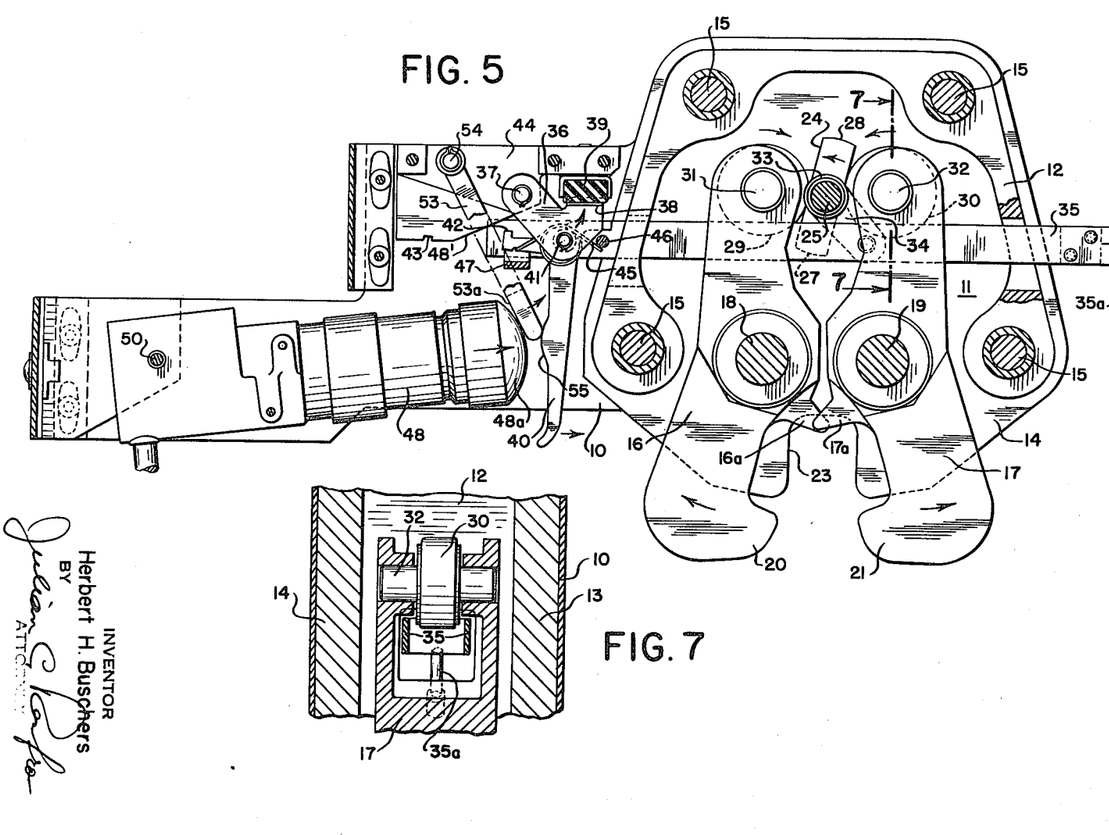
Fig. 5 is a cross-sectional view similar to Fig. 4 illustrating the hook means in released position.
Fig. 7 is a fragmentary cross-sectional view taken generally along line 7—7 of Fig. 5.
Figure 6:
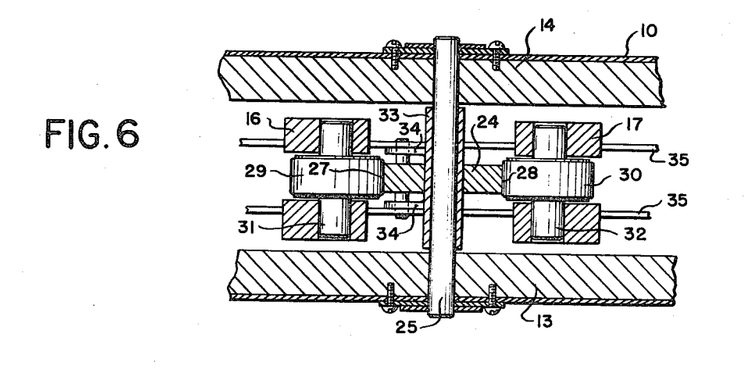
Fig. 6 is a fragmentary cross-sectional view taken generally along line 6—6 of Fig. 4.
Figure 8:
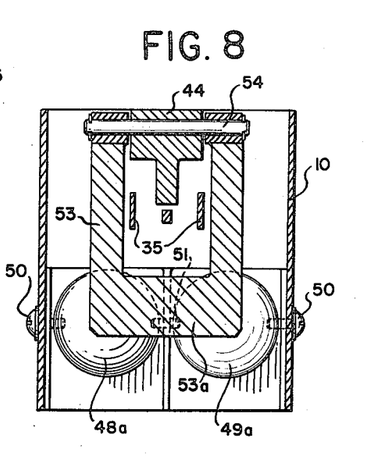
Fig. 8 is a cross-sectional view taken generally along line 8—8 of Fig. 4.

As shown best in Figs. 4 and 5, the frame 11 mounts a pair of tong-like hook members 16, 17 for pivotal movement about transverse axes intermediate the ends of the hook members, suitable heavy duty pivot pins 18, 19 being mounted in the frame plates 13, 14 for this purpose. The lower end portions 20, 21 of the hook members project downwardly below the frame 11 and inwardly toward each other, forming load-engaging portions. When the hook members 16, 17 are in a closed position, that is, with the load-engaging portions moved toward each other, as shown in Fig. 4, the load-engaging portions define an opening 22 adapted to receive the hanger lug (not shown) of a bomb or other object. Notches 23 are also provided in the frame plates 13, 14, in general alignment with the opening 22, to provide for the reception of a hanger lug.

As shown in Fig. 4, the load supporting areas of the hook portions 20, 21 lie inside of the vertical planes through the axes of pivot pins 18, 19. The arrangement is such that any load supported by the hooks will tend to cause the hook members 16, 17 to pivot away from each other, to load-releasing positions. The hook members 16, 17 may therefore be considered to be of a self-releasing type, in that they will automatically release the load supported thereby, unless held in a closed position by some additional means.

In accordance with the invention, the hook members 16, 17 may be held in a closed position by means of a rotatable sear block 24 pivoted on the frame plates 13, 14 by means of a pin 25 located between the upper end portions of the hook members. As shown in Fig. 4, for example, the sear block 24 is in the form of a short bar, pivoted about an axis substantially centrally intermediate its ends. The dimensions of the sear block 24 are such that when the block is rotated to a horizontal position it extends between and engages the separated ends of the hook members 16, 17, to hold the latter in a closed position. The thickness of the sear block 24 is relatively small, however, in relation to its length, so that when the block is rotated about its axis toward a vertical position (Fig. 5), the upper ends of the hooks 16, 17 are free to move together, as under the influence of a load supported by the hook portions 20, 21.

As may be observed in Fig. 4, the upper ends of the hook members 16, 17 are so related to the pivotal axes of the hooks, as defined by the pins 18, 19, and to the rotational axis of the sear block 24, that forces applied to the sear block 24, by the hook members, are directed along a horizontal axis intersecting the rotational axis of the sear block. Accordingly, such forces do not tend to rotate the sear block, or actively to impede its rotation under the influence of external forces. This is an important feature, since the rotation of the sear block is thereby rendered substantially independent of forces applied by the hooks 16, 17, and therefore substantially independent of the magnitude of the load supported by the hooks. The term "substantially independent" is employed advisedly, in that it is recognized that certain frictional forces will increase with increasing loads on the hooks members 16, 17. However, it will be observed that the primary forces applied by the hooks are not so directed as to produce a rotational moment acting upon the sear block, in either direction.

The active end surface portions 27, 28 of the sear block 24 are advantageously arcuate in form, being generated about the rotational axis of the sear block. Accordingly, in any position of the sear block, over a limited angular range, the forces applied thereto act directly through the rotational axis of the block, and do not produce a rotational moment acting on the block.

When the hook members 16, 17 are in a closed position, as shown in Fig. 4, and are supporting a load, as indicated by small arrows L, the hooks are locked in load-engaging position by the sear block 24. In order to release the load, the block is rotated about its axis to an extent such that the arcuate active surface portions 27, 28 of the block move out of contact with the upper ends of the hooks. The inward force applied to the block 24 by the hooks then acts eccentrically upon the block, tending to rotate it toward a vertical position, thus allowing the hooks to move to an open position as indicated in Fig. 5, to release the load.

In order to minimize the effects of frictional forces upon the operation of the sear block 24 and the allied release mechanism, the device of the invention advantageously incorporates antifriction rollers 29, 30 mounted at the upper ends of the hook members by pins 31, 32, in a manner such that the axes of rotation of the rollers 29, 30 are substantially in the same horizontal plane as the rotational axis of the sear block 24. Accordingly, even when loads of large magnitude are supported by the hook members 16, 17, the sear block 24 may be rotated to its release position (Fig. 5) with a minimum of effort. The provision of the rollers 29, 30 also facilitates the manufacture of the device, in that it is unnecessary to provide accurately machined surfaces at the upper ends of the hook members to insure that the load forces are applied to the sear block 24 along the desired axes.

For actuating the sear block 24, when and as desired, the block is mounted on a sleeve 33 (Fig. 6) which carries a pair of spaced lever arms 34 affixed in rigid relation to the sear block and extending downwardly therefrom, as shown in Fig. 4. At its lower end, the lever 34 is pinned to an elongated release bar 35, which is horizontally disposed and extends through openings in the frame members 12 and hook members 16, 17. At its left hand end, as viewed in Figs. 4, 5, the release bar is pivotally connected to an arm 36 (Fig. 11) which, in turn, is pivoted to the housing 10, by means of a pin 37. The arm 36 advantageously has the same operative dimensions as the lever 34, so that upon longitudinal movement of the release bar 35, the lever 34 and arm 36 will pivot in unison and maintain the horizontal disposition of the release bar.

As will be observed in the drawings, the lever 34, release bar 35 and arm 36 are each comprised of a plurality of spaced elements. However, since the spaced elements act together in each case, the respective parts are referred to in the singular, for convenience.

Figure 11:
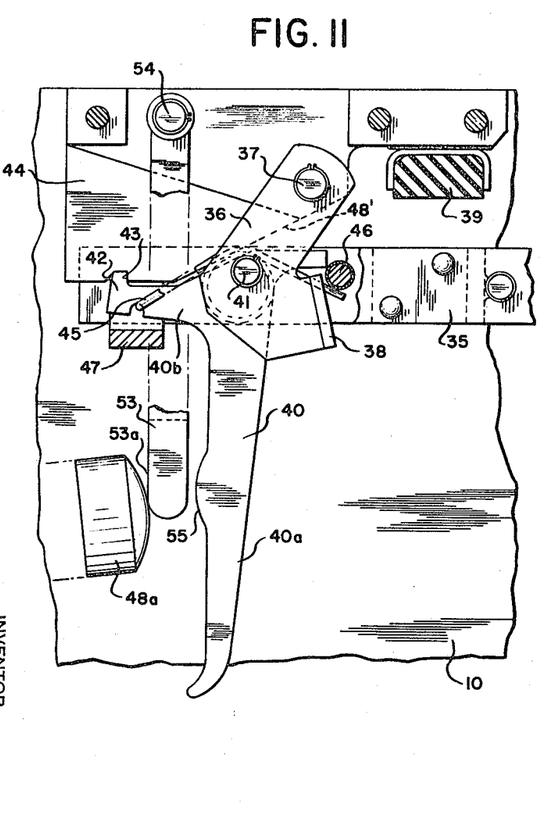
Fig. 11 is an enlarged fragmentary cross-sectional view taken generally along line 11—11 of Fig. 3, and showing a portion of the actuating mechanism for effecting release of a load from the rack.
Figure 12:
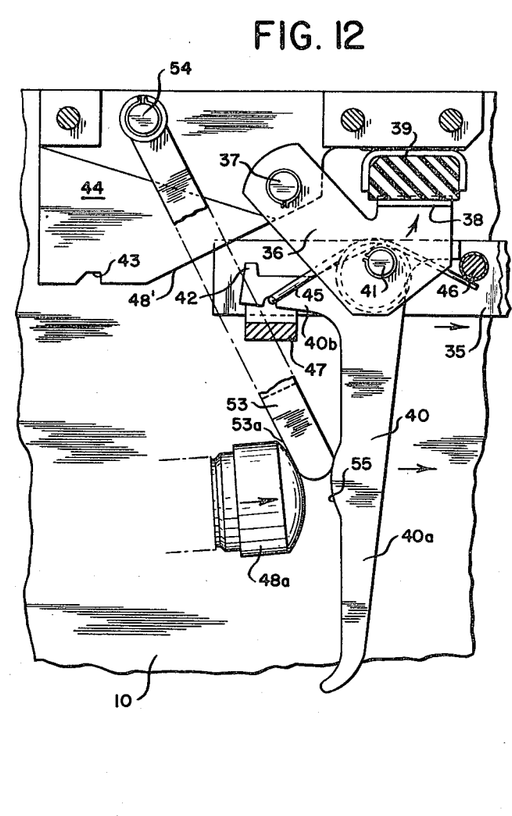
Fig. 12 is a fragmentary cross-sectional view similar to Fig. 11 showing the actuating mechanism in position for releasing a load from the rack.
Figure 13:
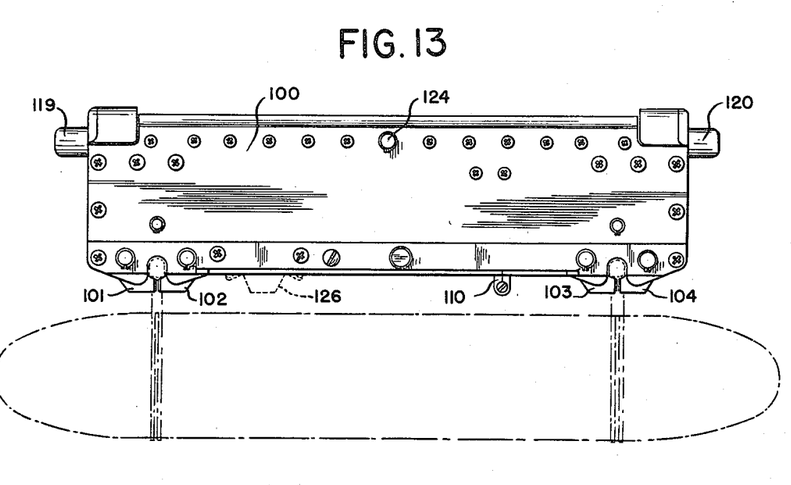
Fig. 13 is a side elevation of a bomb rack constituting a second form of the invention and including spaced hook means.

As shown in Figs. 11, 12, the arm 36 has a flange 38 at its free end, which is adapted to engage a resilient pad 39, when the arm is pivoted in a counterclockwise direction to a limit position, illustrated in Fig. 12. Thus, upon longitudinal movement of the release bar to the right, the lever 34 and arm 36 are pivoted counterclockwise until the flange 38 contacts the pad 39 and prevents further movement of the connected parts. As the arm 36 moves to its limit position, the release bar 35 pivots the lever 34 and causes the sear block 24 to rotate from its active position, as shown in Fig. 4, to its release position, as shown in Fig. 5.

For moving the release bar 35 to its release position, an L-shaped driving lever 40 is pivotally mounted on the release bar by a pin 41, which also pivotally connects the release bar to the arm 36, as shown in Figs. 11, 12. The long leg 40a of the lever 40 extends downwardly from the release bar 35 and has a portion projecting below the housing 10. The short leg 40b of the driving lever extends to the left of the pivot pin 41, and has a latch portion 42 adapted to be received in a notch 43 formed in a block 44, which comprises a fixed part of the housing 10. A spring 45, acting upwardly upon the leg 40b, and upon a pin 46 fixed in the release bar, tends to rotate the driving lever 40 in a clockwise direction about the pivot pin 41. Counterclockwise rotation of the lever 40 is limited by an abutment element 47 carried by and extending across the bottom of the release bar 35, at the left hand end thereof, the abutment being arranged to engage and limit the movement of the leg 40b of the lever 40.

When the release bar 35 is moved to the left, the latch portion 42 of the lever 40 engages and slides along an inclined cam surface 48' on the housing block 44, until the latch reaches the notch 43, whereupon the latch is forced into the notch by the spring 45. The apparatus is thereby locked in load-engaging position, substantially as shown in Fig. 4.

In order to release the hook members 16, 17, the lower leg 40a of the driving lever is urged to the right. Initially, such movement merely causes the lever 40 to pivot about the pin 41, to withdraw the latch 42 from its retaining notch 43. However, after a limited pivotal movement of the lever 40, the short leg 40b thereof engages the abutment 47, and the driving lever, in effect, becomes a fixed part of the release bar 35. Accordingly, continued movement of the driving lever 40 to the right causes the release bar 35 to move to the right, through a more or less arcuate path determined by arm 36 and lever 34, until the flange 38 engages the resilient pad 39. In this limit position, the load engaging mechanism is fully released.

In the form of the invention illustrated in Figs. 1-12, operation of the driving lever 40 is effected by means of tandem actuators 48, 49. The actuators 48, 49 are advantageously pivoted to the frame 10, by means of bolts 50 and pins 51, and normally held in a fixed position in the frame by means of retractable pins 52. The arrangement is such that the actuators are normally rigidly secured in operative positions, while being adapted to be pivoted downwardly, into an accessible position, upon withdrawal of the pins 52.

The actuators 48, 49, a preferred form of which will be described in more detail, are adapted, when operated, to extend the head portions 48a, 49a thereof to the right, toward the driving lever 40. Interposed between the actuators and the driving lever 40 is an impact arm 53, which is pivoted to the frame block 44 by means of a suitable pin 54 and which has a working face 53a of sufficient width to contact both actuator heads 48a, 49a.

When the actuators 48, 49 are energized or operated, the impact arm 53 is driven to the right, into contact with a surface 55 of the driving lever 40. This causes the lever 40 to be driven to the right, first releasing the latch 42 and then driving the lever 40 and release bar 35 to the right to effect release of the hook members 16, 17.

In the event the hook members 20, 21 are frozen in locked position, or otherwise fail to release properly by the action of the supported load, the left hand hook member 16 is struck by extending portions of a pin 35' secured rigidly to the release bar 35 (see Figs. 9, 10). The pin 35' strikes the hook 16 above the pivotal axis thereof and forces the hook to pivot in a counterclockwise or releasing direction.

Prior to loading, the bomb rack is in the position shown in Fig. 5, with the hook members 16, 17 pivoted apart and the release bar shifted to the right. When a bomb lug is inserted upwardly into the opening between the hooks, the lug engages projections 16a, 17a on the hooks and causes the hooks to be pivoted to a closed position. While the bomb or load is supported externally, the release bar 35 may be engaged manually, by a suitable handle 35a, and shifted to the left. This causes the sear block 24 to be rotated to a locking position, as shown in Fig. 4, and causes the latch 42 to become engaged in the notch, so that the release bar is locked in position. Subsequent release of the bar 35 and hooks 16, 17 can be effected only through the actuators 48, 49 or by manually engaging the projecting lower end of the driving lever 40.

Figure 18:
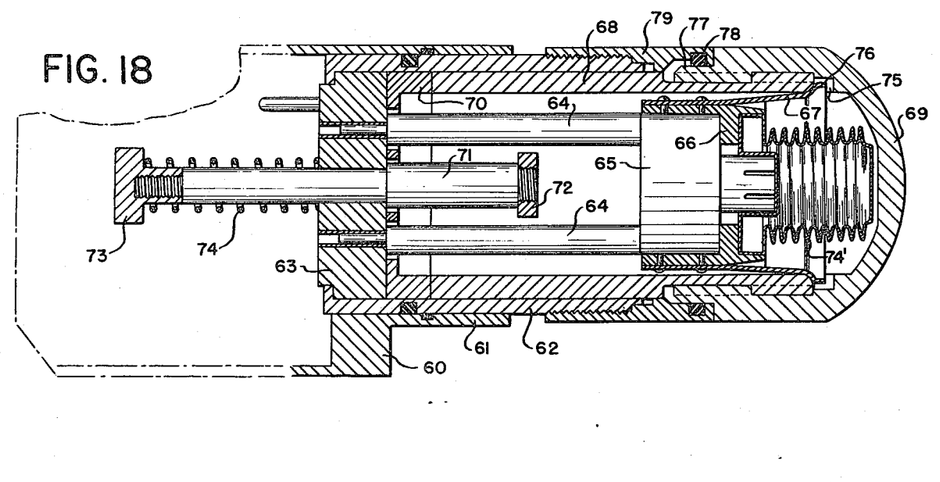
Fig. 18 is an enlarged longitudinal cross-sectional view of an actuator device incorporated in the racks of Figs. 1 and 13.
Figure 19:
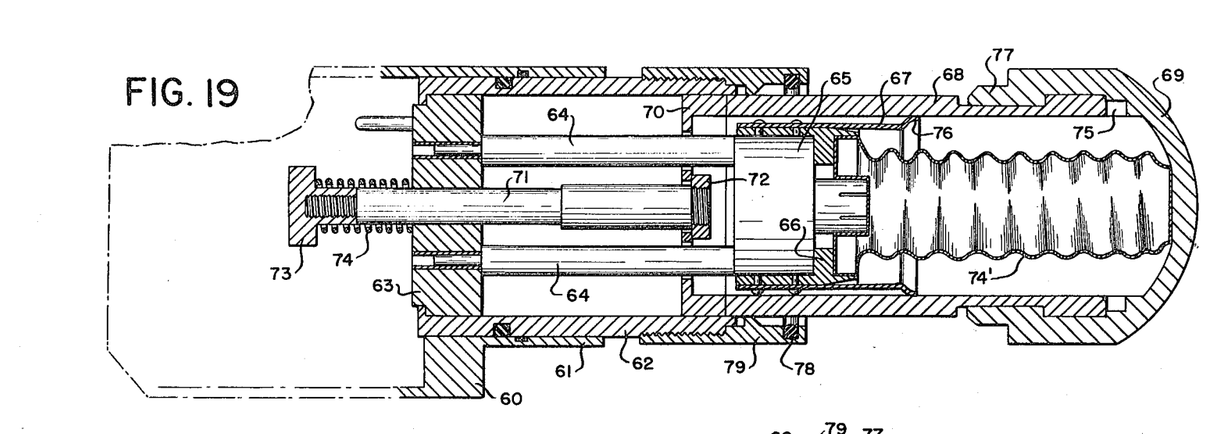
Fig. 19 is a view similar to Fig. 18, with the actuator device in an extended position.

A preferred form of actuator is shown in Figs. 18, 19, wherein the numeral 60 refers to a base part of the actuator, which is adapted to be secured to the frame 10 of the bomb rack in the manner described heretofore. The base 60 has cylindrical neck 61, in which is received and tightly secured a cylindrical sleeve 62. The sleeve 62 has an end wall 63 secured rigidly thereto and closing off its inner end, the outer end of the sleeve being open.

Secured to the end wall 63, by means of a plurality of posts 64, is a pedestal 65, which is of cylindrical form and mounts a flanged fitting 66. The fitting 66, in turn, mounts an outwardly extending skirt 67, of generally cylindrical form, which is formed of flexible material.

Received within the sleeve 62, and slidably guided thereby, is piston-like sleeve 68, which mounts an actuator head 69 at its forward or outer end. The inside diameter of the piston sleeve 68 is somewhat greater than the diameter of the pedestal 65, but somewhat less than the normal outer diameter of the skirt 67, so that the skirt fits tightly against the inner walls of the piston sleeve, as indicated in Fig. 19.

An end wall member 70 is secured to the inner end of the piston sleeve 68 and has a plurality of openings therein for the reception of the posts 64. In addition, the piston end wall 70 is apertured centrally to receive a rod 71 carrying an enlarged nut or flange 72 at its forward end. The inner end portion of the rod 71 projects through the guide sleeve end wall 63 and carries an enlarged nut or flange 73 at its extremity. A spring 74 is interposed between the guide end wall 63 and the flange 73, and normally urges the rod inwardly, or to the left as viewed in Figs. 18, 19.

Carried at the outer end of the pedestal 65, by the flanged fitting 66, is an expandable cartridge casing, which is filled with explosive powder, not specifically shown, and is adapted to expand rapidly, to the length indicated in Fig. 19, upon detonation of the powder charge. The expanding cartridge acts outwardly against the head 69 and drives the piston outwardly with considerable force and speed, upon detonation of the charge. The piston sleeve moves outwardly under the force of the exploded charge until the rod 71 and spring 74, acting between the respective end walls 63, 70 limit further outward movement.

Advantageously, the cartridge 74' is bodily removable from the actuator assembly, whereby the actuator assembly, may be quickly serviced and made ready for further operations. The cartridge casing remains sealed, even after the detonation, so that no cleaning is required.

The actuator is readied for use by installing a charged cartridge, and pushing the piston inwardly until the outer end portion of the skirt 67 engages an annular groove 75, formed in part by the head 69. To this end, the skirt 67 has a flange 76 about its outer end, which engages the groove 75 and acts as a detent to prevent outward movement of the piston, in the absence of detonation of the cartridge or other substantial force.

In the illustrated form of actuator, the head 69 had an axially extending wall 77 which moves into sealing engagement with an O-ring 78 received in a fitting 79 secured to the end of the guide sleeve. Accordingly, when the actuator is loaded and made ready for use, the entire assembly is sealed. This is advantageous in that icing of the internal mechanism under adverse weather conditions is effectively prevented.

The form of the invention shown in Figs. 13–17 is generally similar to the first described embodiment, but incorporates pairs of load engaging members operable in tandem. Thus, an elongated housing 100 supports spaced pairs of pivoted hook members 101, 102 and 103, 104 adjacent the opposite ends of the housing. The pairs of hook members 101–104 are of the self-releasing type, having load engaging portions positioned inwardly of the vertical planes passing through the pivotal axes of the respective hook members.

Each hook member carries an antifriction roller 105 at its upper end, and a rotary sear block 106 is mounted on the housing, between each pair of rollers. The arrangement of the rollers 105 and the sear blocks 106 is such that the axes of rotation of each pair of rollers lie in the same plane as the rotational axis of the sear block positioned between such pair of rollers. The sear blocks are elongated in relation to their thickness and have arcuate active end surface portions generated about the respective rotational axes of the sear blocks, whereby rotation of the blocks to a release position may be effected substantially independent of the load.

An elongated release bar 107 extends over the tops of the hook members 101—104 and is pivotally connected to levers 108, which are rigidly related to the respective sear blocks 106. The right hand end of the release bar is adapted to project outwardly of the housing 100, through an opening 109 therein, when the bar is in a "release" position, whereby the bar may be manually engaged and pushed to the left to lock the hook members in load-engaging position.

Intermediate the ends of the release bar 107 is pivoted a driving lever 110, one leg 110a of which has a latch 111 adapted lockingly to engage a block 112 in the housing 100. One or more actuators 113 are mounted in the housing, in position to act against the driving lever 110, to enable the release bar 107 to be moved to the right to effect release of the load. The driving lever 110 is arranged to pivot somewhat, initially, to release the latch 111, after which the leg 110a engages an abutment element 114 on the release bar to effectively couple the driving lever and release bar together as a rigid mechanical unit. A resilient pad 115 is mounted on the housing block 112, in position to engage a flange 116 on the release bar to arrest movement of the bar in a direction to release the hook members.

In the modified form of the invention, the pairs of hook members 101, 102 and 103, 104 are provided with detent springs 117, 118 which press against the mounting pins 105a for the antifriction rollers 105 and yieldably retain the hook members in either of their operative positions. The strength of the springs 117, 118 is not such as will affect in any way the release of the hooks under the force of the actuator 113, but during loading, and on other occasions, the detent springs are useful in holding the hook members in a preset position.

Figure 14:
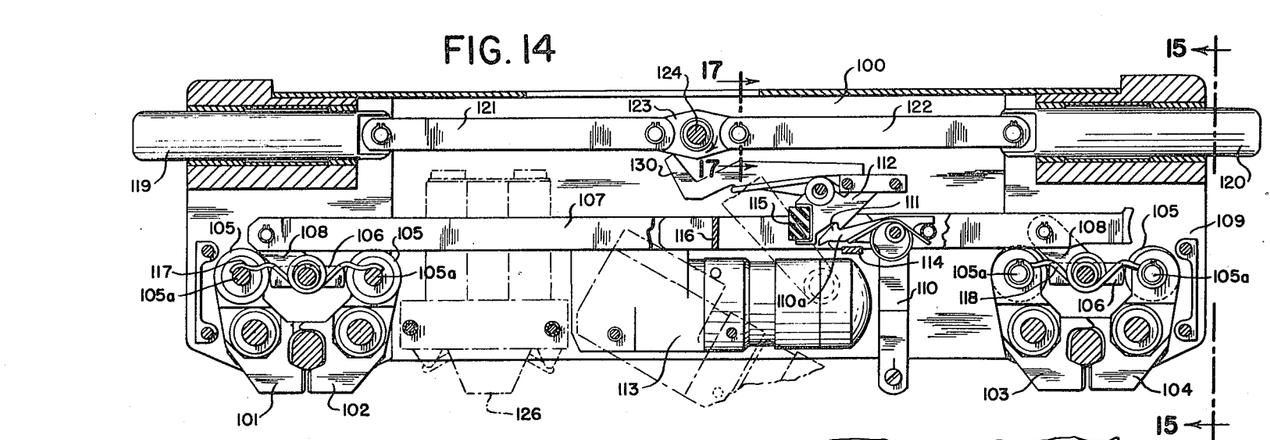
Fig. 14 is an enlarged longitudinal cross-sectional view of the rack of Fig. 13.
Figures 15, 17:
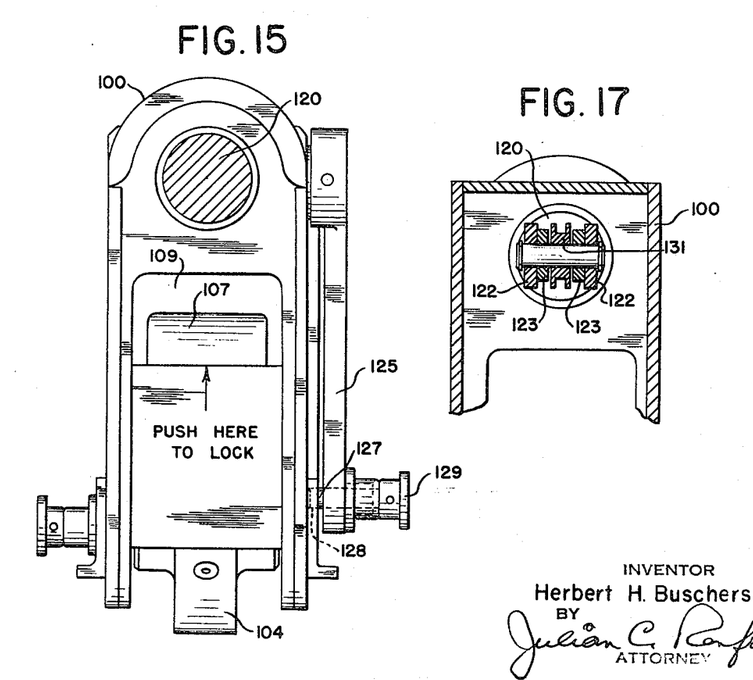
Fig. 15 is a cross-section taken along line 15—15 of Fig. 14.
Fig. 17 is a horizontal cross-sectional view taken generally along the line 17—17 of Fig. 14.
Figure 16:
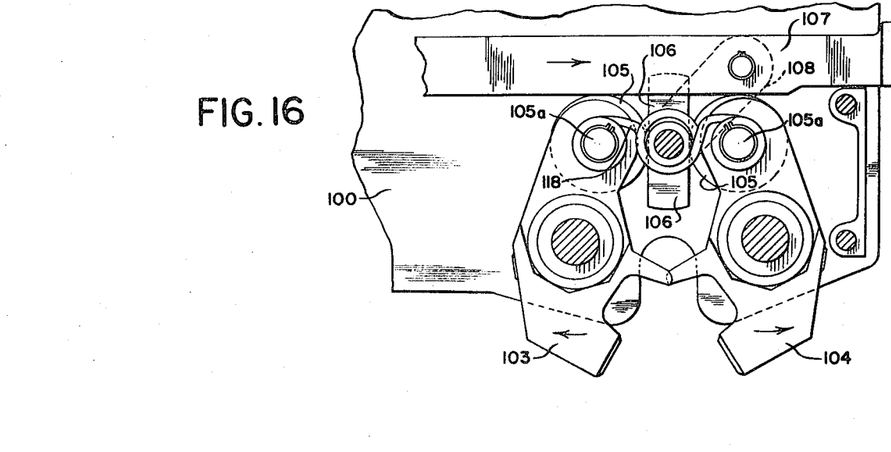
Fig. 16 is an enlarged fragmentary cross-sectional view showing the hook means and release mechanism of the rack of Fig. 13.

For mounting the bomb rack of Figs. 13–17 in an aircraft, there are provided retractible mounting lugs 119, 120, which may be projected from opposite ends of the housing 100. The mounting lugs are connected at their inner ends to links 121, 122 respectively, which are, in turn, connected to a rotatable crank arm 123. The crank arm 123 is affixed to the shaft 124, which carries at its outer end a hand lever 125 (Fig. 15). By appropriate operation of the hand lever 125, the mounting lugs 119, 120 may be projected or retracted as desired, to facilitate the quick mounting or removal of the rack.

Advantageously, the hand lever 125 is provided at its outer end with a spring-loaded detent pin 127 adapted to be received in a recess 128 in the rack frame when the lever is moved to a position to project the lugs 119, 120 from the frame. This securely locks the rack on its supporting bomb bay structure and prevents accidental release or disengagement of the rack. The hand lever may be released by pulling knob 129 out, to withdraw the detent pin 127, after which the lever may be pivoted to retract the lugs 119, 120.

When the lugs 119, 120 are retracted, the crank arm 123 is displaced approximately 90° from the position shown in Fig. 14. In this position, the lower end of the crank arm is releasably engaged by a spring detent 130, so that the lugs 119, 120 are retained in their retracted positions until intentionally moved by manipulation of the lever 125. As shown in Fig. 17, for example, the crank arm carries a roller 131, which engages the spring detent 130 to reduce friction in the operation of the spring detent means.

The illustrated arrangement for releasably mounting the bomb rack of Figs. 13–17 is particularly advantageous in connection with dense loading of bombs on a rotary bomb bay door of the type shown in United States Patent No. 2,634,656, issued April 14, 1953 to A. T. Woollens et al., which patent is owned by the assignee of the present application.

When the rack is used for carrying bombs, it is conventional to provide an appropriate arming device 126. The arming device is mounted in the housing and is energized at an appropriate time to arm the bomb load, prior to release thereof from the rack.

The primary advantageous feature of the invention resides in the provision of load-engaging hook means of a self-releasing type which are operable in a manner substantially independent of the load. This aspect of the invention is realized by providing a rotary sear block having arcuate active surface portions which act between abutment surfaces of both hooks of a pair thereof in a manner such that all forces are directed through the rotational axis of the sear block. The arrangement is such that forces applied to the sear block do not tend actively to rotate the block in either direction. Accordingly, such forces, regardless of the magnitude thereof, have no effect upon the operation of the sear block, except, perhaps, to the extent that frictional forces may increase with increasing loads.

In order to minimize the effects of friction, the apparatus of the invention incorporates antifriction rollers, which are mounted at the ends of the hooks and act against the rotary sear block. The arrangement is such that rotation of the sear block may be accomplished in the absence of excessive friction, even though the load supported by the hooks may be of substantial magnitude.

The improved features of the invention are of importance in the aircraft industry, in that the active parts of the bomb rack may be of reduced weight, and the rack may handle loads of widely varying magnitudes with equal effectiveness.

It should be understood, however, that the forms of the new apparatus herein illustrated and described are intended to be representative only, as certain changes may be made therein without departing from the clear teachings of the invention. Accordingly, reference should be made to the following appended claims in determining the full scope of the invention.

I claim:

1. In a bomb rack of the type having a frame, a pair of self-releasing hook members pivoted on said frame, and releasable means for locking said hook members in position to engage a load, the improvement characterized by said hook members being generally vertically disposed and being pivoted intermediate their ends, the lower portions of said hook members having hook portions adapted when closed to engage and support a load, said hook portions being so related to the respective pivotal axes of said hook members that vertical loads applied to said hook portions tend to move said hook members to a load-releasing position, a rotary sear block mounted on said frame for rotation about an axis disposed between the upper ends of said hook members, said sear block being a bar-shaped member having a length substantially greater than its thickness, said sear block having arcuate active surface portions generated substantially about the rotational axis of said sear block, said sear block being rotatable to bring said active surface portions into engagement with the upper end portions of said hook members whereby to lock said hook members in load-engaging position, and means to rotate said sear block about its rotational axis for a comparatively few degrees to withdraw said active surface portions out of engagement with said hook members, said bomb rack being further characterized by said hook members having transverse openings therethrough along an axis disposed below the rotational axis of said sear block and above the pivotal axes of said hook members, said means to rotate said sear block including a transversely movable release bar extending through said openings, and a driving arm fixed to said sear block and connected to said release bar whereby rotation of said sear block is effected by transverse movement of said release bar.

2. In a bomb rack of the type having a frame, self-releasing hook means pivoted on said frame, and releasable means for locking said hook means in position to engage a load, the improvement characterized by said hook means including a pair of pivotally mounted hook members each having a load-engaging portion and an abutment portion, said load-engaging and abutment portions being positioned on opposite sides of the pivotal axes of said hook members, said load-engaging portions being so related to said pivotal axes that the application of a load to said load-engaging portions tends to pivot said hook members to a load-releasing position, a rotary sear block mounted on said frame for rotation about an axis parallel to said pivotal axes, said sear block comprising a bar-shaped member having a length substantially greater than its thickness, said sear block having arcuate active surface portions including end portions of said bar-shaped member generated substantially about the rotational axis of said sear block, said sear block being rotatable to bring said active surface portions into engagement with said abutment portions, said abutment portions, active surface portions and said axes being so related that when said hook member is under load, said abutment portions are urged toward said sear block and apply force thereto along an axis substantially intersecting the axis of rotation of said sear block, and means to rotate said sear block for a comparatively few degrees to bring about release of the load, said hook members having transverse openings therethrough along an axis disposed below the rotational axis of said sear block and above the pivotal axes of said hook members, said means to rotate said sear block including a transversely movable release bar extending through said openings, a driving arm fixed to said sear block and connected to said release bar whereby rotation of said sear block is effected by transverse movement of said release bar, and latch means associated with said release bar for releasably holding said release bar whereby said sear block is held positively in its locking position.

References Cited in the file of this patent

UNITED STATES PATENTS

| | | |
|---|---|---|
| 2,466,980 | Bronson | Apr. 12, 1949 |
| 2,548,053 | Pierson et al. | Apr. 10, 1951 |
| 2,789,468 | Burns | Apr. 23, 1957 |
| 2,809,557 | Johnson | Oct. 15, 1957 |

FOREIGN PATENTS

| | | |
|---|---|---|
| 362,332 | Italy | Aug. 22, 1938 |